United States Patent [19]
Romani

[11] Patent Number: 6,145,300
[45] Date of Patent: Nov. 14, 2000

[54] INTEGRATED FAN / LOW PRESSURE COMPRESSOR ROTOR FOR GAS TURBINE ENGINE

[75] Inventor: Giuseppe Romani, Mississauga, Canada

[73] Assignee: Pratt & Whitney Canada Corp., Longueil, Canada

[21] Appl. No.: 09/112,236

[22] Filed: Jul. 9, 1998

[51] Int. Cl.[7] .................................................. F02K 3/02
[52] U.S. Cl. ................. 60/226.1; 415/199.4; 416/201 R; 416/200 A
[58] Field of Search ............................... 60/226.1, 226.2, 60/226.3, 262; 415/199.4; 416/201 R, 198 A, 200 A, 203

[56] References Cited

U.S. PATENT DOCUMENTS

| | | | |
|---|---|---|---|
| 3,075,743 | 1/1963 | Sheets | 415/199.4 X |
| 3,673,802 | 7/1972 | Krebs et al. | 60/262 |
| 4,782,658 | 11/1988 | Perry | 60/226.1 |
| 4,969,326 | 11/1990 | Blessing et al. | |
| 5,299,914 | 4/1994 | Schilling | |
| 5,345,760 | 9/1994 | Giffin, III | |
| 5,388,964 | 2/1995 | Ciokajlo | 416/204 A |

FOREIGN PATENT DOCUMENTS 1514096  6/1978  United Kingdom.

Primary Examiner—Timothy S. Thorpe
Assistant Examiner—David J. Torrente
Attorney, Agent, or Firm—Jeffrey W. Astle

[57] ABSTRACT

An integrated fan and low pressure compressor rotor having a hub with a circumferential array of primary blades. Each primary blade has a forward fan blade portion housed in the engine inlet radially extending from the hub to the fan case and a rearward compressor blade portion housed in the core duct radially extending from the hub to the intermediate case. The fan blade portion and compressor blade portion have aerodynamically aligned lateral airfoil surfaces and platforms such that the fan blade portion and compressor blade portion have continuously merged lateral airfoil surfaces and platforms. The integrated rotor replaces two conventional rotors resulting in cost savings.

6 Claims, 3 Drawing Sheets

INTEGRATED FAN / LOW PRESSURE COMPRESSOR ROTOR FOR GAS TURBINE ENGINE

BACKGROUND OF THE INVENTION a) Technical Field

The invention is directed to an integral fan and low pressure rotor for a turbofan gas turbine engine and an associated engine support ring structure that integrates the fan case, intermediate case, and core engine shaft support with radially spanning bypass stator blades and core stator blades.

b) Background of the Art

The intake section of conventional turbofan gas turbine engine includes progressively downstream as follows: a fan rotor housed within a fan case; an intermediate case with flow splitter separating the air flow into a bypass duct and a core duct; stator blades or columns within the core duct and bypass duct for structural support; and for redirecting the air flow appropriately; within the core duct a low pressure compressor blade; and thereafter further core duct stator blades and high pressure compressor rotors.

The complexity of design manufacture and maintenance of the intake section is the focus of the present invention. Manufacture of all blades and rotors require high precision machining operations and involve significant expense. The accurate assembly of numerous components together and maintenance of appropriate clearances is extremely important. In general, if any components can be eliminated or simplified the overall cost of the engine is significantly effected. Especially in the case of small engines, with diameter approximately two to three feet maximum, conventional designs require extremely accurate machining of relatively small components and assembly of these components together with minimal clearance and leakage.

As well, due to relatively low temperatures and pressure in the intake area, the stator blades are prone to accumulate ice and must be heated or otherwise deiced for safe operation, further increasing costs.

It is a object of the invention to rationalize the many complex components of the turbofan intake area reducing the complexity and number of components to achieve savings in manufacturing and maintenance costs.

It is a further object of the invention to enhance the structural integrity of the intake area to replace conventional built up structural supports comprised of many interconnected members with a single integrally cast engine support ring.

DISCLOSURE OF THE INVENTION

The invention is a novel intake for a turbofan gas turbine engine wherein the numerous complex components of conventional fan and low pressure compressor stages have been rationalized and integrated into a simpler, more compact and economic arrangement.

The engine includes an integrated fan and low pressure compressor rotor mounted to a forward end of the shaft immediately upstream of the engine support structure. The hub has a circumferential array of primary blades, each primary blade having: a forward fan blade portion housed in the engine inlet radially extending from the hub to the fan case; and a rearward compressor blade portion housed in the core duct radially extending from the hub to the intermediate case. The fan blade portion and compressor blade portion have aerodynamically aligned lateral airfoil surfaces and platforms enabling a single integrated rotor to replace prior art separate blades thereby simplifying the engine design and reducing the axial length of the engine.

A one piece engine support ring structure replaces numerous engine parts with a single cast metal alloy component integrating engine mounts, fan case, intermediate case, engine core, and cascade stator blades radially spanning between the core and intermediate case, and between the intermediate case and the fan case. The fan case includes external engine mounts disposed in a radially extending support surface defined by the mounts and a point on a longitudinal axis of the engine. The intermediate case has a forward flow splitter that separates air flow into a bypass flow and a core flow through the engine, an annular bypass duct defined between the fan case and intermediate case, and an annular core duct defined between the engine core and the intermediate case. Engine core supports mount the shaft for rotation about the longitudinal axis. An annular axially cascading array of bypass stator blades is aligned in the support surface and spans between the fan case and the intermediate case. An annular axially cascading array of core stator blades is aligned in the support surface and spans between the intermediate case and the core.

The integration of the fan and low pressure rotors into a single unit reduces the length of the engine and significantly simplifies manufacture and maintenance. One forward stator array is eliminated and with it the need to provide de-icing on this stator array.

The integrated engine support ring combines several conventional components into a single investment cast ring, including bypass and core stator blades, fan case, intermediate case and engine core shaft support. As a result of the integration of components, the manufacturing of small engines in particular is simplified, the engine length and weight are reduced. Aerodynamic efficiency of the integrated fan/compressor blade rotor is improved over conventional designs and structural integrity of a single integrated engine support ring is superior to conventional built up engine structures.

Further details of the invention and its advantages will be apparent from the detailed description and drawings included below.

BRIEF DESCRIPTION OF THE DRAWINGS

In order that the invention may be readily understood, one preferred embodiment of the invention and a variation thereof will be described by way of example, with reference to the accompanying drawings wherein.

DETAILED DESCRIPTION OF PREFERRED EMBODIMENTS

Figure 1:
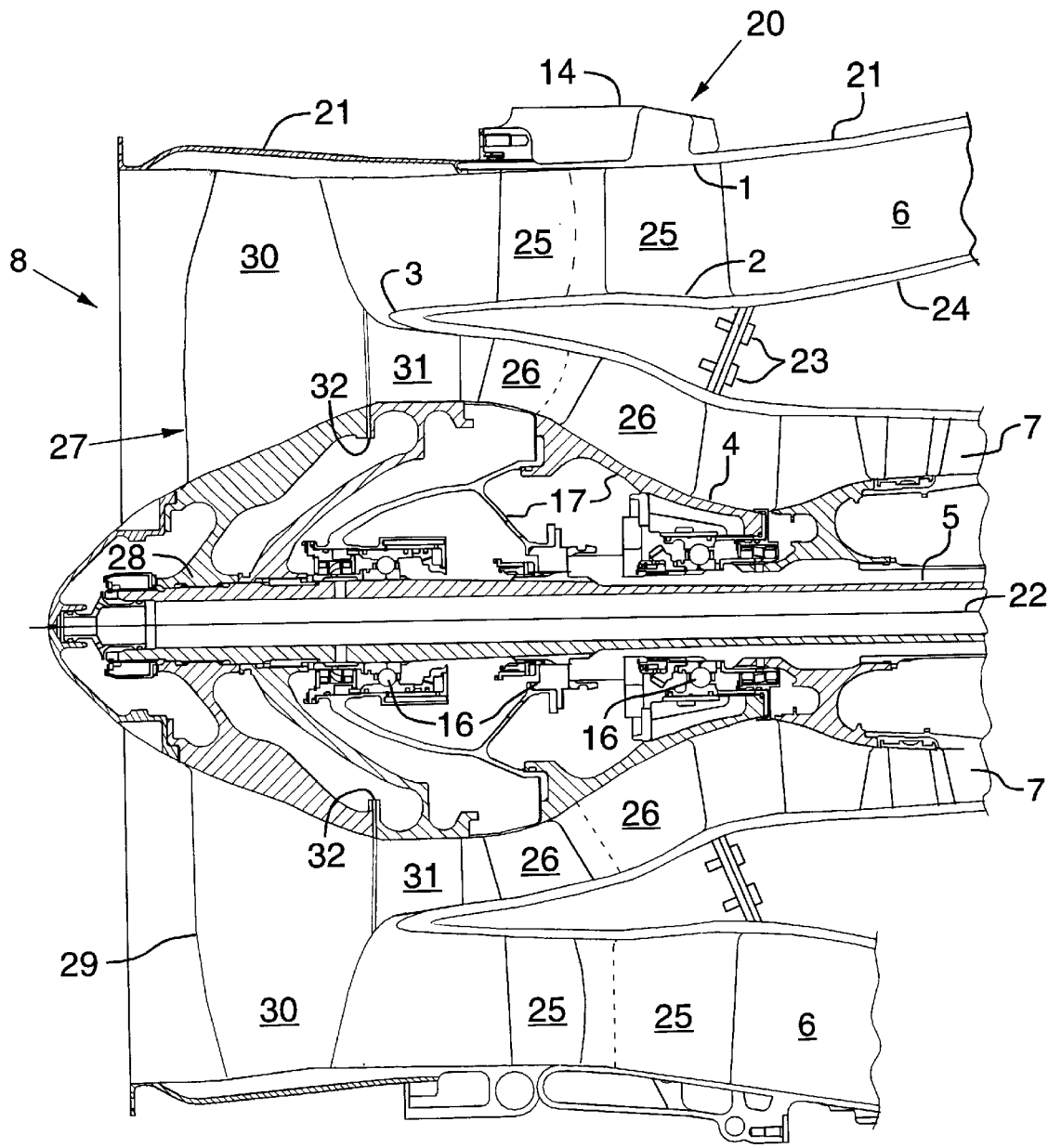
FIG. 1 is an axial cross-section through the intake section of a turbofan gas turbine engine including an integrated fan and low pressure compressor rotor immediately upstream of an integrated engine support ring structure including fan case, intermediate case, and engine core shaft support with radially extending bypass stator blades and core stator blades in an integrated single cast component.
Figure 2:
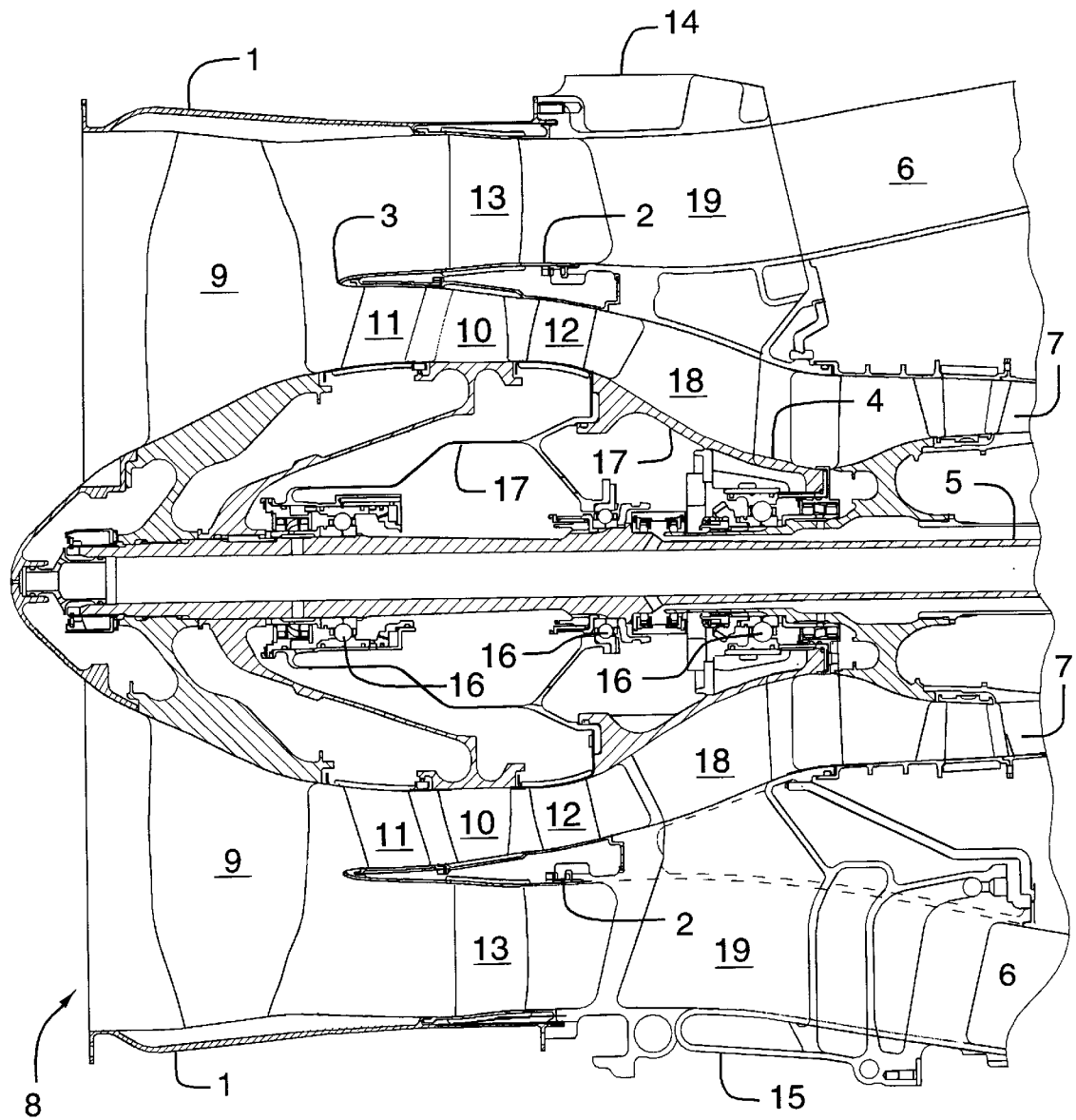
FIG. 2 is a like axial cross-section through a turbofan engine according to the prior art for comparison purposes with FIG. 1.

FIG. 1 shows an axial cross-section through a turbofan intake section in accordance with the invention whereas FIG. 2 shows a conventional turbofan engine for comparison purposes. As shown in FIG. 2, a conventional turbofan gas turbine engine includes a fan case 1, an intermediate case 2 with a forward flow splitter 3 and an engine core 4 with a shaft 5 mounted for rotation about a longitudinal access. An annular bypass duct 6 is defined between the fan case 1 and the intermediate case 2. An annular core duct 7 is defined between the core 4 and the intermediate case 2. The engine inlet 8 is defined radially inward of the fan case 1 and forward of the flow splitter 3.

The conventional turbofan engine illustrated in FIG. 2 includes a forward fan rotor with fan blades 9 mounted to the shaft 5 and a low pressure compressor rotor with compressor blades 10 also mounted to the shaft 5. In the conventional turbofan design, between the fan blades 9 and the compressor blades 10 is disposed an array of stator blades 11. These forward stator blades 11 are prone to accumulate ice and require deicing systems which are relatively expensive and difficult to maintain. A significant aspect of the modified design according to the invention as shown in FIG. 1, is the elimination of these first row of stator blades 11.

Also, as shown in a prior art embodiment of FIG. 2, immediately downstream of the low pressure compressor blades 10 is a further row of stator blades 12. Within the bypass duct 6 are also disposed an initial row of bypass stator blades 13.

The engine is mounted to the aircraft fuselage with an engine mount 14 disposed on the outersurface of the fan case 1. Also disposed on the fan case 1 at the bottom as drawn is an auxiliary equipment mount 15. The shaft 5 is conventionally supported within the engine core 4 on three sets of bearings 16. The bearings 16 are housed within a core shell 17 joined to the intermediate case 2 with radially extending core columns 18 which have a profile allowing them to function as core stator blades 18. In a like manner, the intermediate case 2 is joined to the fan case 1 and accordingly engine mount 14 by bypass columns 19 which also have a profile allowing them to function as bypass stator blades 19. Therefore, in summary, the shaft 5 is rotatably supported on bearings 16 housed within the stationary core shell 17 which is in turn supported with core columns 18 to intermediate case 2 supported with bypass columns 19 to fan case 1 and engine mount 14.

As can be seen in respect of the above description of a conventional prior art turbofan engine, there are several interconnected components all of which must be accurately machined and assembled with close tolerances and minimal leakage. The stator blades 11, 12 and 13 additionally are individually manufactured and assembled to the intermediate case 2 and fan case 1 through the technique known as "potting" wherein they are secured in place.

A comparison of the prior art conventional design in FIG. 2 and the invention illustrated in FIG. 1 will reveal a number of modifications which all tend to simplify the design and reduce the number of components. In brief overall view, the initial array of stator blades 11 has been eliminated. The fan blade 9 and low pressure compressor blade 10 have been brought together in an integrated rotor. In the bypass duct area, the bypass stator blade 13 and bypass column 19 have been axially drawn closer together into a cascade stator blade assembly. In a like manner, the core stator blade 12 and core columns 18 have been axially brought together and replaced with a cascading core stator blade assembly.

As a result, the invention illustrated in FIG. 1 includes an integrated engine support structure ring 20 which integrates several components into a single casting which can be manufactured using investment casting methods or machined with greater accuracy and speed compared to conventional designs. The engine support structure ring 20 includes a portion of the fan case 1 connected forwardly and rearwardly to fan case extensions 21. Fan case 1 includes external engine mount 14. Between the engine mount 14 and a support point on the longitudinal axis 22 of the engine, a radially extending support surface is defined through which stresses are transferred from the shaft 5 to the engine mounts 14 through the engine support structure ring 20.

The engine support structure ring 20 includes a forward portion of the intermediate case 2 bolted with bolts 23 at a joint with the downstream portion 24 of the intermediate case 2. The engine core 4 includes bearings 16 as is conventional for mounting the shaft 5 for rotation about the longitudinal axis 22. It can be seen from a comparison between FIGS. 1 and 2 that the axial length of the core shell 17 has been substantially reduced as a result. As well, the axial length of the annular bypass duct 6 and the annular core duct 7 are according reduced.

A significant modification as mentioned above is in the provision of an annular axially cascading array of bypass stator blades 25 which span between the fan case 1 and the intermediate case 2. The bypass stator blades 25 are aligned in the support surface defined between the engine mount 14 and the longitudinal axis 22. Also aligned with the support surface is an annular axially cascading array of core stator blades 26 spanning between the intermediate case 2 and the engine core 4.

A further significant modification comparing FIG. 1 with FIG. 2 is the provision of an integrated fan and low pressure compressor rotor 27 immediately upstream of the engine structure 20.

The integrated fan and low pressure compressor rotor 27 includes a central hub 28 mounted to a forward end of the shaft 5. The hub 28 has a circumferential array of primary blades 29. Each primary blade 29 has a forward fan blade portion 30 housed in the engine inlet 8 and radially extending from the hub 28 to the fan case 1. Each primary blade 27 also includes a rearward downstream compressor blade 31 housed in the core duct 7 and radially extending from the hub 28 to the intermediate case 2.

In the embodiment shown in FIG. 1, the fan blade portion 30 and compressor blade portion 31 are releasably fastened together with bolts and flanges at joint 32. In the alternate embodiment shown in FIG. 3, the fan blade portion 30 and compressor blade portion 31 have continuously merged lateral airfoil surfaces and platforms to present a smooth continuous air foil surface. In both cases however, the fan blade portion 30 and compressor blade portion 31 have aerodynamically aligned lateral air foil surfaces and platforms. However, in the case of embodiment shown in FIG. 1, the fan blade portion 30 and compressor blade portion 31 have discontinuous lateral air foil surfaces which are separated by a radially extending gap. This discontinuity and joint 32 are presented as an alternative in the event that they are required for simple manufacture, machining and assembly. It is preferred however, as illustrated in FIG. 3 to manufacture the integral rotor 27 with continuously merged lateral air foil surfaces and platforms without any gap.

Figure 3:
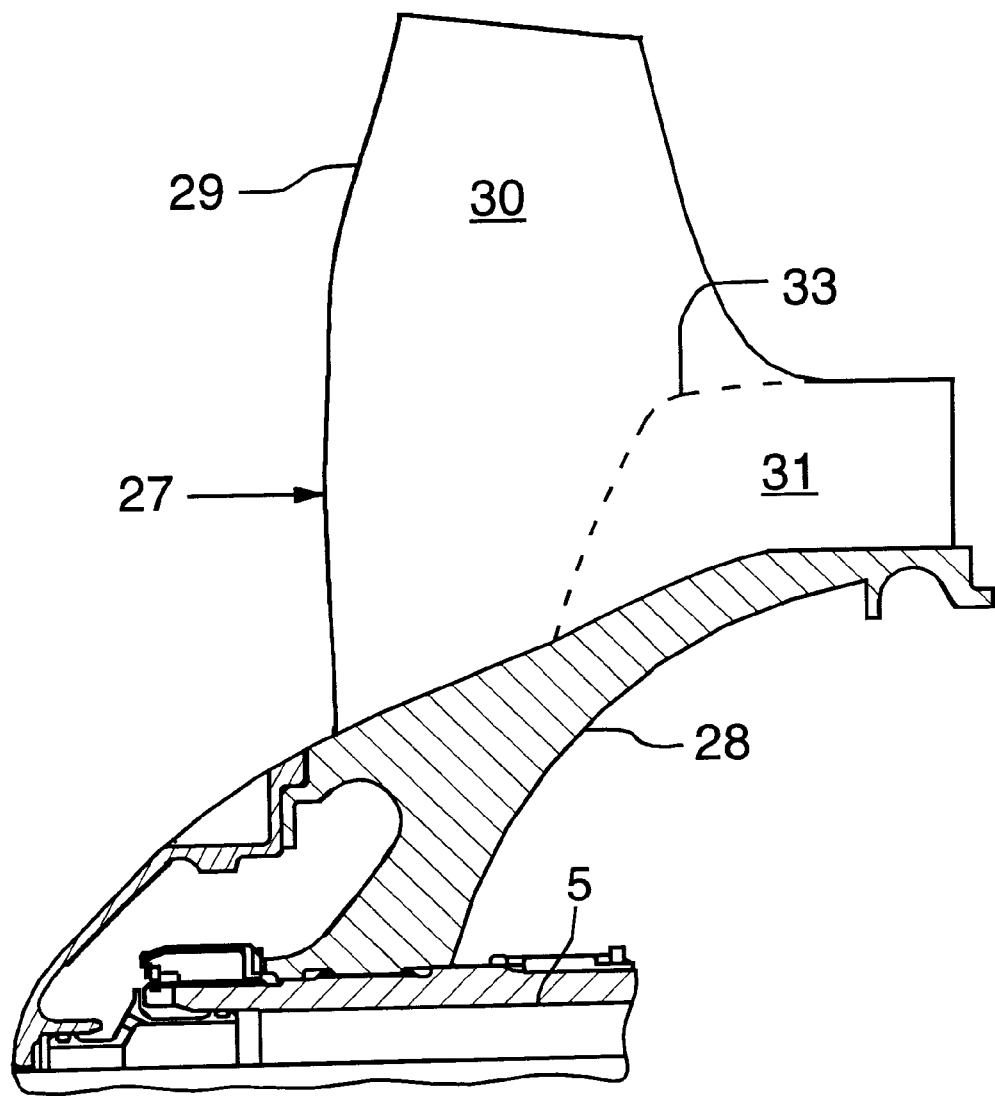
FIG. 3 is a detail view of an alternative integrated rotor where fan blade portion and compressor blade portion are manufactured as a single unit, also including a circumferential array of auxiliary compressor blades disposed between the compressor blade portions of the primary blades.

As illustrated as well in the alternative embodiment of FIG. 3, the integrated fan and low pressure rotor 27 further includes a circumferential array of auxiliary compressor blades 33 disposed between compressor blade portions 31 of the circumferential array of primary blade 29 and also housed in the core duct 7 extending from the hub 28 to the intermediate case 2. The auxiliary compressor blades 33 combine with the primary compressor blade portions 31 to propel the core air flow through the core duct 7 in an improved manner.

Although the above description and accompanying drawings relate to a specific preferred embodiment as presently contemplated by the inventor, it will be understood that the invention in its broad aspect includes mechanical and functional equivalents of the elements described and illustrated.

The embodiments of the invention in which an exclusive property or privilege is claimed are defined as follows:

1. In a turbofan gas turbine engine having: a fan case; an intermediate case with a forward flow splitter; and an engine core with a shaft mounted for rotation about a longitudinal axis, an annular bypass duct defined between the fan case and intermediate case, an annular core duct defined between the core and the intermediate case, and an engine inlet defined inward of the fan case forward of the flow splitter, the improvement comprising an integrated fan and low pressure compressor rotor comprising:

a hub mounted to a forward end of the shaft, the hub having a circumferential array of primary blades, each primary blade having: a forward fan blade portion housed in the engine inlet radially extending from the hub to the fan case; and a rearward compressor blade portion housed in the core duct radially extending from the hub to the intermediate case, the fan blade portion and compressor blade portion having aerodynamically aligned lateral airfoil surfaces and platforms wherein the fan blade portion and compressor blade portion have continuously merged lateral airfoil surfaces and platforms.

2. An integrated fan and low pressure compressor rotor according to claim 1 wherein the fan blade portion and compressor blade portion are releasably fastened together.

3. An integrated fan and low pressure compressor rotor according to claim 1 further comprising a circumferential array of auxiliary compressor blades disposed between compressor blade portions of the circumferential array of primary blades and housed in the core duct radially extending from the hub to the intermediate case.

4. An intake for a turbofan gas turbine engine comprising:
an engine support structure comprising:
a fan case with external engine mounts disposed in a radially extending support surface defined by the mounts and a point on a longitudinal axis of the engine;
an intermediate case with a forward flow splitter;
engine core support means for mounting a shaft for rotation about the longitudinal axis;
an annular bypass duct defined between the fan case and intermediate case;
an annular axially cascading array of bypass stator blades aligned in the support surface and spanning between the fan case and the intermediate case;
an annular core duct defined between an engine core and the intermediate case;
an annular axially cascading array of core stator blades aligned in the support surface and spanning between the intermediate case and the core;
an engine inlet defined inward of the fan case forward of the flow splitter; the engine further comprising,
an integrated fan and low pressure compressor rotor immediately upstream of the engine support structure, the rotor comprising:
a hub mounted to a forward end of the shaft, the hub having a circumferential array of primary blades, each primary blade having: a forward fan blade portion housed in the engine inlet radially extending from the hub to the fan case; and a rearward compressor blade portion housed in the core duct radially extending from the hub to the intermediate case, the fan blade portion and compressor blade portion having aerodynamically aligned lateral airfoil surfaces and platforms wherein the fan blade portion and compressor blade portion have continuously merged lateral airfoil surfaces and platforms.

5. An intake for a turbofan gas turbine engine according to claim 4 wherein the fan blade portion and compressor blade portion are releasably fastened together.

6. An intake for a turbofan gas turbine engine according to claim 4 further comprising a circumferential array of auxiliary compressor blades disposed between compressor blade portions of the circumferential array of primary blades and housed in the core duct radially extending from the hub to the intermediate case.

* * * * *